United States Patent [19]
Wagoner

[11] Patent Number: 5,932,995
[45] Date of Patent: *Aug. 3, 1999

[54] DUAL BUCK CONVERTER WITH COUPLED INDUCTORS

[75] Inventor: Robert G. Wagoner, Waukesha, Wis.

[73] Assignee: MagneTek, Inc., Nashville, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/033,891

[22] Filed: Mar. 3, 1998

[51] Int. Cl.⁶ .................................................... G05F 1/46
[52] U.S. Cl. ........................................ 323/222; 323/282
[58] Field of Search .................................. 323/222, 224, 323/271, 282, 351

[56] References Cited

U.S. PATENT DOCUMENTS

| | | | |
|---|---|---|---|
| 4,184,197 | 1/1980 | Cuk et al. | 363/16 |
| 4,502,104 | 2/1985 | Mitchell | 363/26 |
| 4,703,409 | 10/1987 | Spreen | 363/45 |
| 4,713,742 | 12/1987 | Parsley | 363/124 |
| 4,931,716 | 6/1990 | Jovanovic et al. | 323/285 |
| 5,006,782 | 4/1991 | Pelly | 323/225 |
| 5,144,222 | 9/1992 | Herbert | 323/271 |
| 5,646,837 | 7/1997 | Weggel | 363/124 |
| 5,668,466 | 9/1997 | Vinciarelli et al. | 323/282 |
| 5,723,913 | 3/1998 | Weggel | 307/113 |

*Primary Examiner*—Adolf Deneke Berhane
*Attorney, Agent, or Firm*—Waddey & Patterson; Mark J. Patterson

[57] ABSTRACT

This invention relates to a dual buck converter used to reduce an unregulated high input voltage without a ground reference to a regulated output voltage. This is accomplished by coupling the inductors of two independent buck converters. The input voltage is split across the dual buck converter and the mid point is balanced by coupling the inductors and switching the two switches at the same time. The inductors are wound on a single core, with the windings magnetically coupled, to form a new coupled inductor.

18 Claims, 3 Drawing Sheets

DUAL BUCK CONVERTER WITH COUPLED INDUCTORS

BACKGROUND OF THE INVENTION

The present invention relates generally to DC-to-DC power conversion systems. More particularly, this invention pertains to dual buck converters capable of reducing an unregulated high DC input voltage to a lower regulated DC output voltage.

Buck converters are commonly used to reduce a high voltage DC supply or input voltage from a higher to a lower magnitude that is more suited to the device being powered. As shown in FIG. 1, prior art buck converter circuits generally use a solid state switching device IGBT1 connected in series with an inductor L1 to a load (not shown), with an output filter capacitor C2 across the load. A diode D1 is normally connected in shunt with the load and the output filter capacitor C2 at the input side of the inductor L1, so that current will continue to flow through the inductor L1 when the switch IGBT1 is off. In a conventional buck converter of this type, the output voltage is dependent on the input voltage and on the duty cycle of the switch. The duty cycle is determined by an external switching control circuit (not shown) connected to a control input on the switch.

In applications requiring relatively high input and output voltages, a chopper module that includes an IGBT (insulated gated bipolar transistor) switch is often used. However, a chopper module rated at 3300 volts, for example, usually has a proportionately high current rating in the range of 200 Amps. These are very expensive products, and unnecessarily so if the load current is substantially below the rating of the device. One solution for this problem is to use two chopper modules having lower voltage and current ratings, with a lower total cost. An example of such a solution is shown in the prior art circuit of FIG. 2. The input voltage is split across the two independent buck converters. The lowest cost is attained when each buck converter reduces half the input voltage. This is effective if the input has a ground reference, i.e. a Y transformer. If the input has no ground reference, i.e. a delta transformer, is the converter circuit has no control of the input voltage mid-point. Without mid-point control, the mid point will drift and the input and output voltages will not be balanced.

What is needed, then, is a dual buck converter circuit that will work with an unregulated high DC voltage input without a ground reference, to produce a regulated and balanced DC voltage output, using lower cost switching components.

SUMMARY OF THE INVENTION

This invention relates to a buck converter to reduce an unregulated high DC input voltage to a regulated reduced DC output voltage. An objective of this invention is to reduce costs by avoiding the need for high current-rated switching devices. This is accomplished by coupling the inductors of two independent buck converters to produce a dual buck converter with coupled inductors. The input voltage is split across the dual buck converter and the mid point is balanced by coupling the inductors and switching the two IGBT switching devices at the same time.

In one embodiment of the invention, the coupled inductors are wound on a single core having a common magnetic path, with the windings magnetically coupled in a common mode arrangement.

For current sensing, one may conveniently use a Hall Effect current sensor on the coupled conductor. This current sensing can be used for closing the current control loop and for over current protection on both switches.

Imbalances in switching may cause the new dual buck converter to oscillate. A resistor can be added between the input and output capacitors to dampen the resonant circuit without adversely effecting the buck converter operation.

DESCRIPTION OF THE PREFERRED EMBODIMENTS

Figure 1:
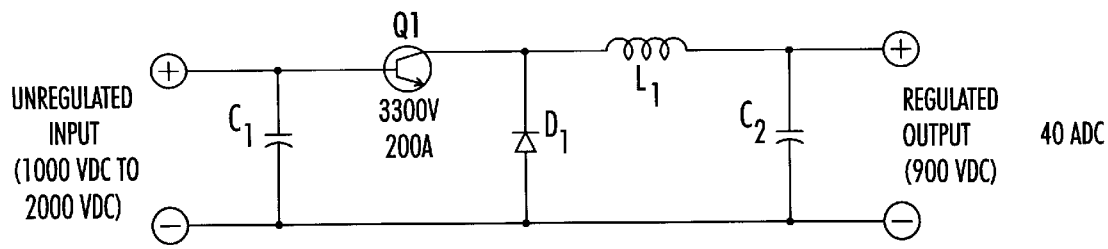
FIG. 1 is a schematic diagram of a prior art single buck converter.
Figure 2:
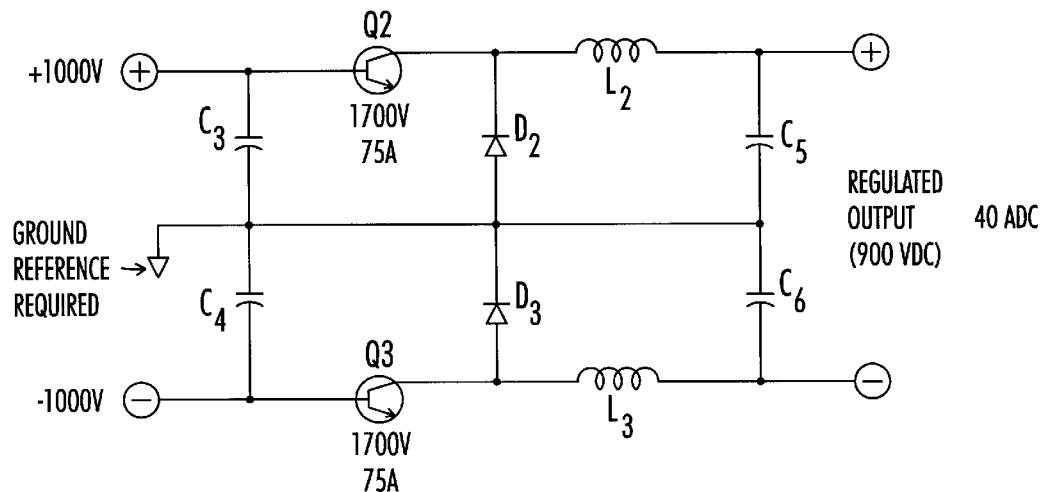
FIG. 2 is a schematic diagram of a prior art dual buck converter operating from a balanced input with a ground reference.

The applicant's invention will be best understood when considered in light of the following description of the preferred embodiments of the invention, as illustrated in the attached drawings wherein like reference numerals and characters refer to like parts.

Figure 3:
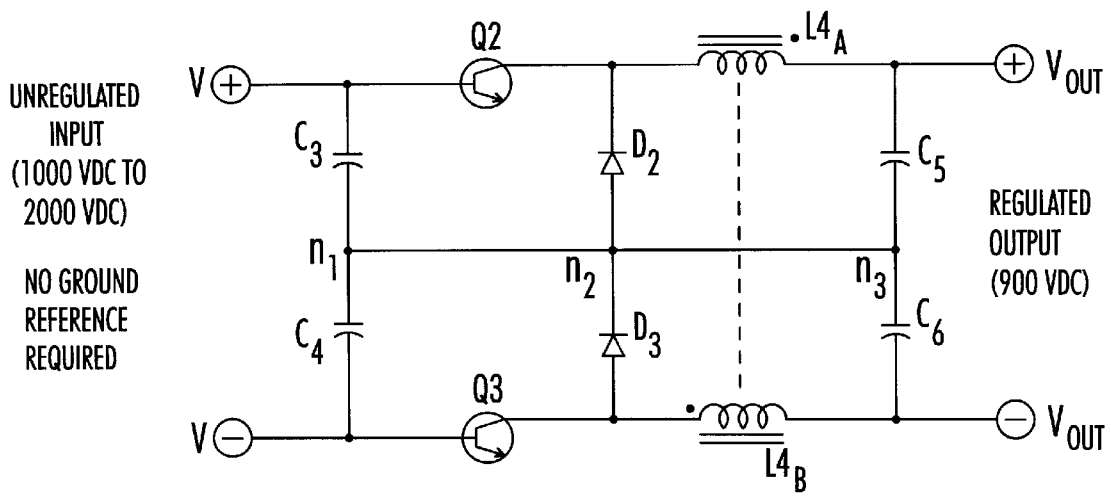
FIG. 3 is a schematic diagram of a first embodiment of the dual buck converter of the present invention, operating from a balanced input without a ground reference.

A first embodiment of the novel dual buck converter of the present invention is shown schematically in FIG. 3. Two buck converters are used to split the input voltage between them, thereby reducing the needed voltage rating of the switch. The input voltage is unregulated and does not have a ground reference. Such input is typically from a delta transformer (not shown). Thus, first and second input capacitors C3 and C4 are connected in series between positive DC input terminal V+ and negative DC input terminal V−. A pair of solid state switches IGBT2 and IGBT3 are connected in series with windings L4a and L4b respectively of an inductor L4. The opposite ends of lo windings L4a and L4b are connected to DC output terminals Vout+ and Vout− respectively. First and second output filter capacitors C5 and C6 are connected in series across the output terminals Vout+ and Vout−. Diodes D1 and D2 are also connected in series on the switched side of switches IGBT2 and IGBT3. The common nodes n1, n2, and n3 of the series connected input capacitors C3, C4, diodes D2, D3, and output capacitors C5, C6 are electrically connected to form a mid-point of the input and output voltages. Preferably, the switches IGBT2 and IGBT3 are insulated gate bipolar transistors, each rated at one-half of the total input voltage and output current requirements of the load (not shown). The switching and duty cycle of the switches IGBT2 and IGBT3 are controlled by a conventional external control circuit that is connected to the control terminals (gates) of the switches IGBT2 and IGBT3. Such circuits and control schemes are well known in the art.

To prevent drift of the circuit mid-point voltage and thus maintain a balanced output, windings L4a and L4b are wound on a single core having a common magnetic path and coupled in a common mode arrangement. The polarity of the windings is indicated conventionally by the dots shown on FIG. 3. Using this novel coupled inductor topology, and if the two switches IGBT2 and IGBT3 are caused to switch at the same time, the mid point will be stable and a balanced output voltage will be attained.

Figure 5:
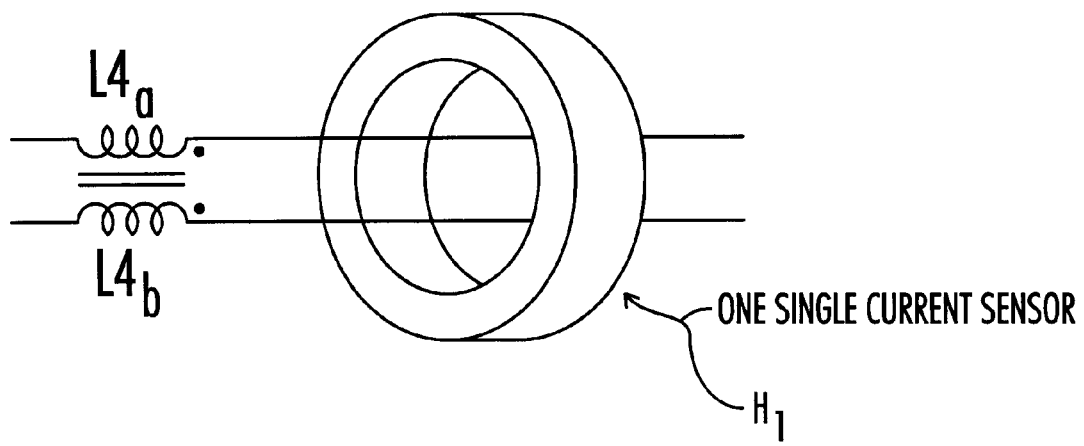
FIG. 5 is schematic diagram showing the coupled inductors as used in the dual buck converters of FIGS. 3 and 4, further illustrating showing the use of a single Hall effect current sensor for switching control or overcurrent protection.

Many designers will want to use current sensing in the output circuits of the buck converters to close a current control loop for the control circuit (not shown) and/or as part of an over current protection circuit for the switches. To accomplish this, the arrangement shown in FIG. 5 can be used. A Hall effect current sensor H1 is positioned so that windings L4a and L4b pass through and are electromagnetically coupled to sensor H1. The polarity of the windings must be aligned in the same direction through the current sensor H1.

Figure 6:
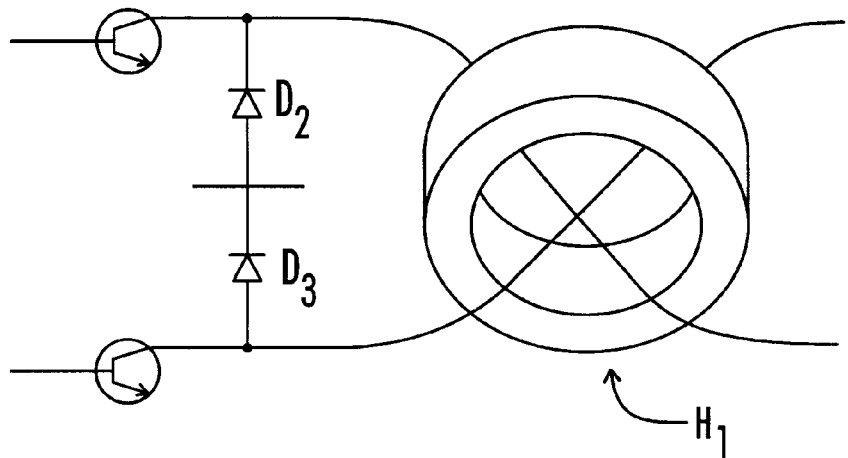
FIG. 6 is a partial schematic diagram of the dual buck converters of FIGS. 3 and 4, showing an alternative coupling of a Hall effect current sensor to the circuit.

FIG. 6 shows an alternate arrangement for the Hall effect current sensor H1. The sensor H1 is positioned so that the current flowing from the switches to the coupled inductor L4 passes first through the sensor H1. The wire connections must be crossed as indicated so that the current direction is common to both connections.

Figure 4:
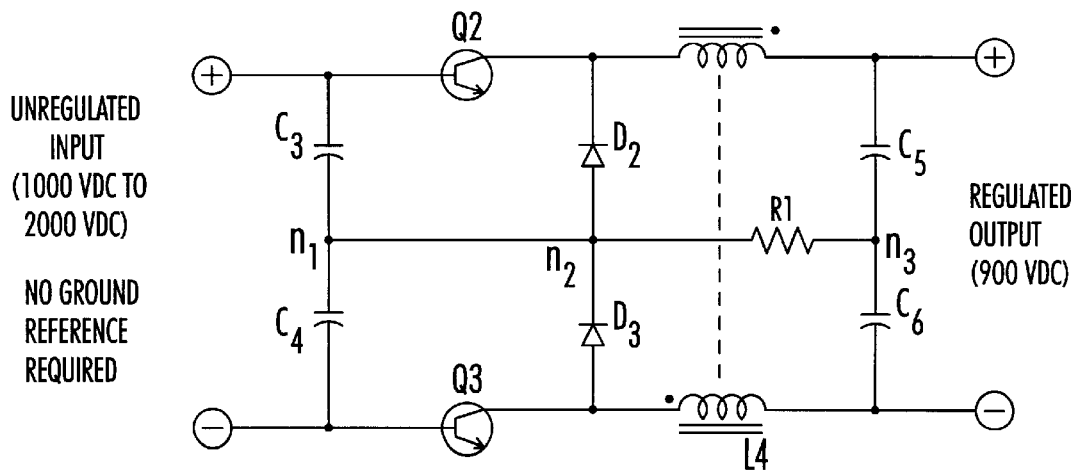
FIG. 4 is a schematic diagram of the dual buck converter of FIG. 3, with a resistor to dampen potential oscillation of the circuit.

Imbalances in switching may cause the dual buck converter of FIG. 3 to oscillate. To prevent this, FIG. 4 shows a slightly modified circuit in which a resistor is connected between nodes n2 and n3. The value of resistor R1 must be large enough to dampen the resonance of the circuit, and small enough not to effect ordinary circuit operation.

The resonant frequency of the circuit changes when the switches are on and off. When the switches are off, current flows through diodes D2 and D3 and the resonant frequency is determined by inductor L4 and capacitors C5 and C6. When the switches are on, capacitors C3 and C4 become part of the resonant circuit, thereby increasing the resonant frequency.

At resonance, the capacitive reactance, $X_c$, equals the inductive reactance, $X_L$, of the circuit. To dampen resonance, the value of the resistor R1 must be larger than $X_c$ or $X_L$. If the equivalent series resistance of the capacitors combined with the resistance in L4 is larger than $X_c$ or $X_L$, then the additional resistor R1 is not required.

Thus, although there have been described particular embodiments of the present invention of a new and useful DUAL BUCK CONVERTER WITH COUPLED INDUCTORS, it is not intended that such references be construed as limitations upon the scope of this invention except as set forth in the following claims.

What is claimed is:

1. A dual buck converter for providing a reduced DC output voltage to positive and negative DC output terminals from a DC input voltage applied to positive and negative DC input terminals comprising:
    a. a first switch having an input side electrically connected to the positive DC input terminal and a switched side electrically connected to a first inductor winding;
    b. a second switch having an input side electrically connected to the negative DC input terminal and a switched side electrically connected to a second inductor winding;
    c. first and second diodes connected at a common diode node and in series between the switched sides of the first and second switches; and
    d. the first and second inductor windings wound on a common core and having a common magnetic path to form a magnetic coupling between the first and second inductor windings; and wherein
    e. the converter is operable to turn the first and second switches on at the same time, such that the DC output voltage is balanced between the positive and negative DC output terminals with respect to the common diode node, when the converter is operated without a ground reference.

2. The dual buck converter of claim 1 further comprising first and second output capacitors connected at a common output capacitor node and in series between the positive and negative output terminals, the common output capacitor node electrically connected to the common diode node.

3. The dual buck converter of claim 2 further comprising first and second input capacitors connected at a common input capacitor node and in series between the positive and negative input terminals, the common input capacitor node electrically connected to the common diode node.

4. The dual buck converter of claim 3 further comprising a current sensor coupled to the first and second inductor windings.

5. The dual buck converter of claim 3 wherein the common diode node is electrically connected to the common output capacitor node through a resistor.

6. The dual buck converter of claim 3 wherein the first and second switches are insulated gate bipolar transistors.

7. A dual buck converter comprising:
    a. a first buck converter circuit having a first switch electrically connected between a positive DC input terminal and a positive DC output terminal through a first inductor;
    b. a second buck converter circuit having a second switch electrically connected between a negative DC input terminal and a negative DC output terminal through a second inductor;
    c. each of the first and second buck converter circuits including a common output inductor, the common output inductor comprising the first and second inductors wound on a common core and magnetically coupled;
    d. the first and second buck converter circuits further including first and second diodes connected at a common diode node and connected in series from a first location between the first switch and the positive DC output terminal to second location between the second switch and the negative DC output terminal; and
    e. the dual buck converter operable to switch the first switch and second switch on at the same time to produce a DC output voltage between the negative DC output terminal and the positive DC output terminal that is balanced with respect to the common diode node, when the converter is operated without a ground reference.

8. The dual buck converter of claim 7 further comprising:
    (a) first and second output capacitors connected in series between the positive and negative DC output terminals.

9. The dual buck converter of claim 3, further comprising: a current sensor positioned between the first and second switches and the first and second inductor windings; and wherein a connection between the first switch and the first inductor crosses a connection between the second switch and the second inductor to create a common current direction through the current sensor.

10. The dual buck converter of claim 3, further comprising a current sensor through which the first and second inductor windings pass and to which they are electromagnetically coupled.

11. The dual buck converter of claim 3, further comprising a resistor between the common output capacitor node and the common diode node, wherein the resistor has a value sufficiently large to dampen a circuit resonance.

12. A method of producing a regulated DC voltage output, comprising the steps of:

a. providing a dual buck converter having a pair of DC input terminals, a pair of switching devices, and an inductor having a pair of inductor windings wound on a common core;

b. supplying a voltage to the DC input terminals;

c. magnetically coupling the pair of inductor windings;

d. turning the switching devices on to conduct at the same time to form a voltage mid-point and to balance the voltage midpoint, when the converter is operated without a ground reference.

13. The method of claim 12, further comprising the step of switching the switching devices at the same time to produce the regulated DC voltage output.

14. The method of claim 13, wherein the step of switching comprises switching two insulated gate bipolar transistors.

15. The method of claim 12, further comprising the step of dampening a circuit resonance.

16. The method of claim 15, further comprising the steps of:

adding a resistor between a pair of input capacitors and a pair of output capacitors to effect the dampening step;

serially connecting the pair of input capacitors across the DC input terminals of the dual buck converter; and serially connecting the pair of output capacitors across a pair of DC output terminals of the dual buck converter.

17. The method of claim 12, further comprising the step of sensing a current in an output circuit of the dual buck converter.

18. The method of claim 12, wherein the step of magnetically coupling the pair of inductors comprises the steps of:

winding a first inductor winding of one of the pair of inductors about a single core; and winding a second inductor winding of another of the pair of inductors about the single core.

* * * * *